(12) United States Patent
Stein

(10) Patent No.: US 9,864,076 B2
(45) Date of Patent: Jan. 9, 2018

(54) GAIN STABILIZATION OF SCINTILLATION DETECTOR SYSTEMS

(71) Applicant: TARGET SYSTEMELEKTRONIK GMBH & CO. KG, Wuppertal (DE)

(72) Inventor: Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 0 days.

(21) Appl. No.: 15/499,565

(22) Filed: Apr. 27, 2017

(65) Prior Publication Data

US 2017/0227659 A1    Aug. 10, 2017

Related U.S. Application Data

(63) Continuation of application No. PCT/EP2014/073037, filed on Oct. 27, 2014.

(51) Int. Cl.
  *G01T 1/40* (2006.01)
  *G01T 1/20* (2006.01)

(52) U.S. Cl.
  CPC .............. *G01T 1/40* (2013.01); *G01T 1/2018* (2013.01)

(58) Field of Classification Search
  None
  See application file for complete search history.

(56) References Cited

U.S. PATENT DOCUMENTS

2005/0258371 A1    11/2005    Stein et al.

OTHER PUBLICATIONS

International Search Report with a Written Opinion issued for corresponding International Application No. PCT/EP2014/073037 dated Jul. 24, 2015.

*Primary Examiner* — Edwin Gunberg
(74) *Attorney, Agent, or Firm* — Myers Wolin, LLC

(57) ABSTRACT

A method and device are provided for obtaining the energy of nuclear radiation from a scintillation detector system for the measurement of nuclear radiation the device comprising a scintillation crystal, a light readout detector and a fast digital sampling analog to digital converter. The method comprises obtaining the anode current at the LRD for at least one scintillation event with N photo electron charges at the entrance of the LRD, sampling the measured anode current, obtaining the function of the scintillation pulse charges $Q_{dint}(N, G)$ at the anode of the LRD from said scintillation events, obtaining the RMS of the noise power charge $Q_{drms}(N, G)$, obtaining the function $Q_{dSN}(N)$ by calculating the ratio of $Q_{dint}(N, G)$ and $Q_{drms}(N, G)$, obtaining the constant gradient k from the function $Q_{dSN}(N)=Q_{dint}(N, G)/Q_{drms}(N, G)=k*N$, and obtaining N.

7 Claims, 2 Drawing Sheets

GAIN STABILIZATION OF SCINTILLATION DETECTOR SYSTEMS

CROSS REFERENCE TO RELATED APPLICATIONS

This application is a continuation of International Application No. PCT/EP2014/073037, filed on Oct. 27, 2014, the contents of which are incorporated by reference herein.

TECHNICAL FIELD

The invention relates to a method for obtaining the energy of nuclear radiation from a scintillation detector system for the measurement of nuclear radiation, preferably gamma radiation, said scintillation detector comprising a scintillation crystal, a light readout detector (LRT), preferably a photo detector with a photomultiplier tube (PMT) with dynodes, and an evaluation system connected to the output port of the LRT, i.e. the anode of the LRT. The invention also relates to a stabilized detector system, making use of the inventive method.

BACKGROUND

Such methods and systems are known in the art. It is especially known that the gain G of a scintillation detector system, comprising a scintillator, a photocathode and a light readout detector (LRT), mostly comprising a photomultiplier tube (PMT), together with an evaluation system, is subject to a change in gain over time. The gain change of the overall system is substantially effected by the gain change of the LRT. That gain change is due to environmental changes, i.e. a modification in temperature over time or other environmental factors.

In order to stabilize the gain of the LRT, it is known in the art to conduct several measurements over time and to compare the results. An initial or reference measurement may take place at beginning of the first measurement of nuclear radiation, for example using a calibration source with well-known energies of the emitted gamma radiation. The light signals, produced by the gamma radiation in the scintillator crystal, are proportional to the energy deposited in that crystal. The light signals do then hit the LRT, i.e. a photocathode, causing that photocathode to emit electrons which are collected by a PMT. The number of photons produced in the scintillator per energy unit is called absolute light yield. The percentage of photons converted to photoelectrons at the photocathode of a PMT is the quantum efficiency (QE). According to Knoll, Radiation Detection and measurement, $3^{rd}$ Ed. 2000, page 269, a typical light yield for a detector system, using a standard NaI(Tl) crystal from which nearly all the light is collected, is in the order of 38 photons per keV energy loss. Geometric and the quantum efficiency losses finally yield 8 to 10 photoelectrons at the photo cathode.

A PMT comprises a series of dynodes and a final anode. The—usually very few—photoelectrons from the photocathode are accelerated towards the first dynode where they cause emission of a multitude of secondary electrons, being emitted from that first dynode. The number of secondary electrons emitted per primary incident electron is the overall multiplication factor $\delta$. Those electrons are then accelerated to the next dynode, where their number is again multiplied typically by the same factor $\delta$, those electrons being led to the next dynode and so on, until they finally reach the anode of the PMT. Given that $\delta$ is the same for all of the N dynodes, the resulting gain G is then proportional to $\delta^N$ ($\Pi_{\nu=1}^{N} \delta_p$). At the anode a current signal is measured, being proportional to the charge of the multitude of electrons. That charge is proportional to the amount of light, generated in the scintillator and therefore proportional to the energy deposed by the gamma radiation in the scintillator. Similar considerations apply when the LRT makes use of an amplifier other than a PMT, like an Avalanche diode or a semiconductor photomultiplier.

The resulting charge signal is then further processed and usually stored in a multichannel analyzer (MCA), each channel of that MCA corresponding to a specific radiation energy, deposed in the scintillator crystal. An accumulation of such energy signals results in an energy spectrum, each line in that spectrum corresponding to a specific energy deposed in the detector system.

As the charge signal is in a known relation to the number of photoelectrons emitted from the photocathode, one could, in theory, count the number of photoelectrons emitted from the photocathode also. In real life measurements, this not possible, even if it is known from Bellamy et al., Nucl. Instr. and Meth. in Phys. Res. A 339 (1994) 468-476, that there are statistical methods to estimate the amount of photoelectrons other than by charge integration, namely by deconvoluting a PMT spectrum.

For most applications, it is of interest to obtain the best resolution in energy a system allows. One of the problems, leading to a decrease in energy resolution is the gain shift, which is to be avoided therefore.

In order to do so, it is known to measure the gain at different times, using gamma radiation with known energy. This gamma radiation with known energy may be emitted by a calibration source, or by another radiation source with known energies. The gain of the at least two measurements at different times is compared and the signals are corrected by the difference, therefore multiplying all signals by a so-called gain correction factor, thereby stabilizing the overall system.

It is also known to use artificial light pulses instead of light pulses, generated by the scintillation crystal following the absorption of radiation energy. Such an artificial light source may be an LED.

The disadvantage of all this known systems is that one has to know either a specific—constant—line (energy) in the spectrum to be measured or to use a calibration source, thereby interrupting the measurement from time to time. In addition, especially at high count rates, it may be difficult to obtain a stabilization spectrum at all.

SUMMARY

The aim of the present invention is therefore to avoid the above-mentioned disadvantages and to provide a self-stabilizing scintillation detector system without the need of identifying specific lines in the output spectrum, identified as calibration sources, and to correct the gain on the basis of the shift of those lines.

This problem is solved by a solution, described in the characteristic parts of the claims.

The disclosure proposes a method for obtaining the energy of nuclear radiation from a scintillation detector system for the measurement of nuclear radiation, preferably gamma radiation, comprising a scintillation crystal, a light readout detector (LRT) and a fast digital sampling analog to digital converter (ADC), the scintillator being selected from a group of materials, having a light decay time of at least 1 ns, the method comprising the steps of obtaining the anode current $I_A(t)$ at the LRT for at least one scintillation event with N photo electron charges $q_e$ at the entrance of the LRT, the LRT set to a suitable gain G, sampling the measured anode current $I_A(t)$ with a predefined sampling rate, obtaining the function of the scintillation pulse charges $Q_{dint}(N, G)$ at the anode of the LRT from said scintillation events by integrating the anode current $I_A(t)$ for a specific time period $\Delta t$, starting at a time $t_0$, i.e. by summarizing the digitized anode current samples $i_\tau$ for each scintillation event, obtaining the root mean square (RMS) function of the noise power charge $Q_{drms}(N, G)$ by calculating the square root of the summed squares of the second difference of digitized anode current samples $i_\tau$ for each such scintillation event, obtaining the function $Q_{dSN}(N)$ by calculating the ratio of $Q_{dint}(N, G)$ and $Q_{drms}(N, G)$, that ratio being an almost linear function of the number N, then obtaining the constant gradient k from the at least one function $Q_{dSN}(N)=Q_{dint}(N, G)/Q_{drms}(N, G)=k*N$, and obtaining the number N, said number N being equivalent to the energy E deposed in the scintillator by a nuclear radiation event, from the ratio of the measured values $Q_{dint}(N, G)$ and $Q_{drms}(N, G)$ and the gain factor k. The light readout detector is preferably a photomultiplier tube (PMT) or a photo tube with a photo cathode as light detector, a semiconductor photomultiplier, or an Avalanche Photodiode or any other light readout detector (LRT) multiplying the number of photoelectrons with a gain G.

Preferably, the output signal of the LRT is sampled with a sampling rate, being at least 5, preferably at least 200 and even more preferred at least 1.000 times faster than the light decay constant of the scintillator selected. When using a NaI(Tl) crystal as scintillator material, the output signal of the LRT should be sampled with a sampling frequency of at least 20 MHz, preferably with a sampling frequency between 200 and 4.000 MHz. It should be noted that the use of higher sampling rates is possible and even preferred.

Also part of the invention is a stabilized detector system for the measurement of nuclear radiation, preferably gamma radiation, comprising a scintillation crystal, a light readout detector (LRT) and a fast digital sampling analog to digital converter (ADC), the scintillator being selected from a group of materials, having a light decay time of at least 1 ns, the ADC being set to operate with a very high sampling rate of at least 5 MHz, so that the detector system is being operated to conduct the method steps of the claims. As the signal processing needs not necessarily be handled with digital means, the invention does also cover a stabilized detector system for the measurement of nuclear radiation, preferably gamma radiation, comprising a scintillation crystal, a light readout detector (LRT) and an analog signal electronics for evaluation of the data, the scintillator being selected from a group of materials, having a light decay time of at least 1 ns, whereby the analog signal electronics is mapped to the digital electronics of claims as described above in order to substitute the digital electronics by an analogue setup, so that the detector system is being operated to conduct the method steps of one the claims.

BRIEF DESCRIPTION OF THE DRAWINGS

A specific example will be described in the following, referring to FIGS. 1 to 3, describing the principle set of the claimed system. It shows:

DETAILED DESCRIPTION

Figure 1:
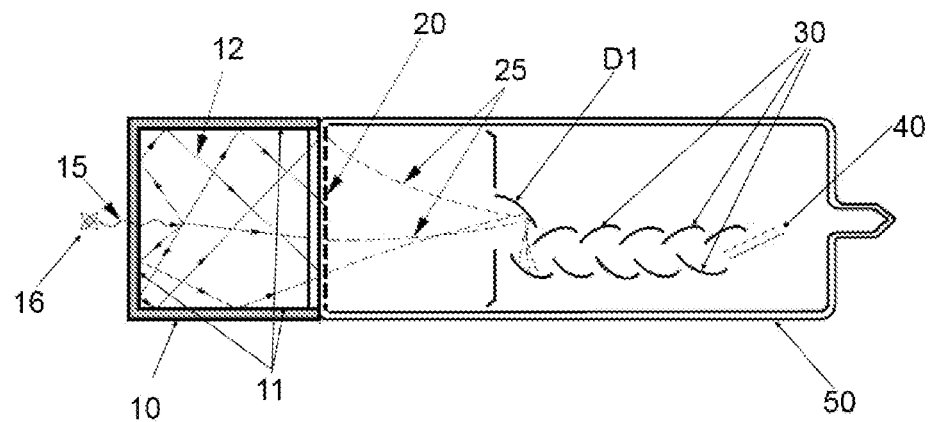
FIG. 1, showing a principle setup of the detector system,
FIG. 2, showing a digitized current signal of a measured 30 keV NaI(Tl) scintillation pulse,
FIG. 3, showing simulated noise charges vs photoelectron counts

FIG. 1 shows a general setup of a detector system, which is known in the art. Shown is a scintillator crystal 10 with a reflective coating 11, reflecting the light 12, emitted from the scintillator when a gamma ray 15 from a radiation source 16 interacts with the scintillator crystal 10. At one side of the scintillator crystal 10, a photocathode 20, connected to a PMT 50, is located. There is no reflective coating in a scintillator crystal 12 at the side of the photocathode 20.

When the light 12 hits the photocathode 20, photoelectrons 25 are emitted and directed to a dynode chain 30, hitting the first dynode D1. The number of electrons hitting the first dynode D1 is then multiplied by a factor $\delta$ from the first dynode, then hitting the second third and so on dynodes before leading to the anode 40. The resulting anode current $I_A(t)$ is digitized with an appropriate sampling rate, resulting in digitized anode current samples $i_\tau$. Individual pulse charges are collected by integrating the anode current starting at the trigger time $t_0$ for a specific time period $\Delta t$. The current integration is realized by summing the digitized anode current samples $i_\tau$. They can be expressed in terms of the suppositional cathode current samples $j_\tau$ and the electron multiplication gain G:

$$Q_{int}(N, G) := \sum_N q_e(t_n) = \int_{t_0}^{t_0+\Delta t} I_A(t)dt \cong Q_{dint}(N, G) := \sum_{\tau_0}^{\tau_0+\Delta \tau} i_\tau = \sum Gj_\tau$$

It is of course also possible to measure the charge signal with analogue electronics. Doing so, the current signal from anode 40 is directed to a preamplifier, a voltage amplifier and a discriminator before it is further processed by an analog to digital converter (ADC).

In any case, the resulting digital signal is stored in a memory, i.e. a memory of a multichannel analyzer. That spectrum—the "energy spectrum"—may be further evaluated with a computer.

In practice, only charge integrating measurements as described above can capture the total charge of the signal. The second charge measuring method, a direct count of the photoelectrons, might still be possible after applying advanced deconvolution techniques. However, deconvolving photoelectron shapes accurately enough for counting, is rendered impossible in real measurements due to noise and statistical photoelectron pulse shape variations.

Figure 2:
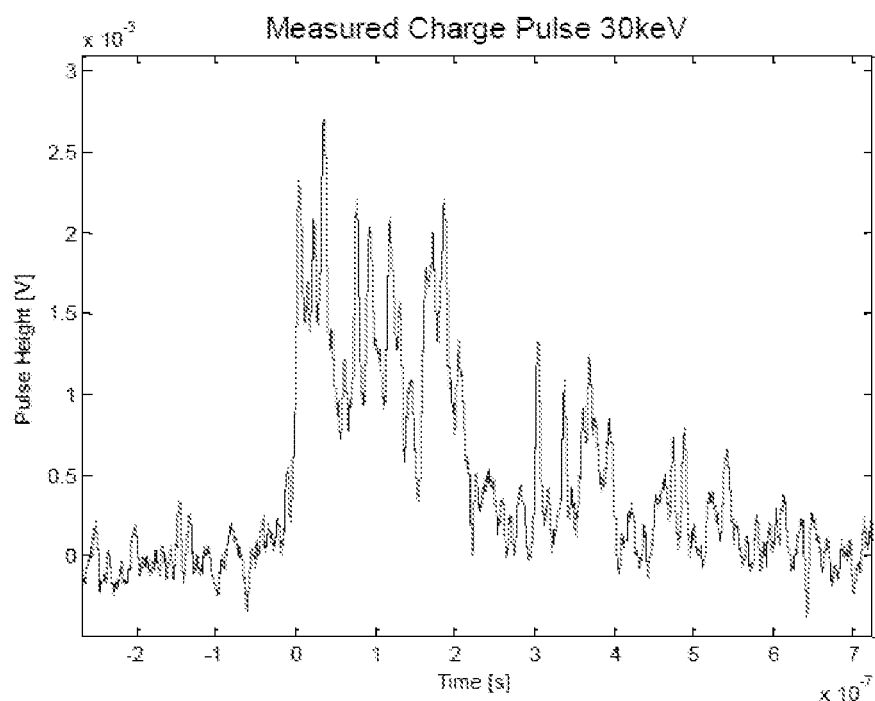

FIG. 2 shows the digitized current signal of a 30 keV NaI(Tl) scintillation pulse. It has been acquired at 10 Gs/s at 1 GHz bandwidth and subsequently smoothed by a 10-tap moving average FIR filter. The fragmented trace illustrates a typical complex signal and the difficulty to distinguish photoelectrons from noise is obvious. There is no method to count photoelectrons directly in this case. The single electron pulse width and noise prohibit photoelectron counting even at otherwise sufficiently high sampling rates.

The invention for the first time makes use of the fact that there is a principal difference between the patterns of low energy and high energy pulses when studying those on an oscilloscope. The rough pattern of the visible single photoelectrons at low energies will smooth out significantly towards higher energies. According to the invention, this photoelectron-pattern is described as random noise, added to the spectrum. In the following, this noise pattern will be called photoelectron "noise charge".

This so-called photoelectron noise charge is calculated in an RMS (root mean square) expression, equivalent to the electronic noise power calculation. It is also the same calculation as for the second moment of a noise distribution. The inventor found that the second moment scaled by the total charge is independent of the PMT electron gain. In other words, the pulse pattern itself—the photoelectron noise charge—always is a measure of the energy of a scintillation event, no matter which scale or amplification gain.

This follows from the definition of the noise (power) charge function $Q_{drms}$ for the digitized pulse current, which can be described as follows:

$$Q_{drms}(N,G) := \sqrt{\Sigma i_\tau^2} G \sqrt{\Sigma j_\tau^2}$$

The ratio $Q_{dSN}$ of the total charge $Q_{dint}(N,G)$, expressed in terms of the (virtual) cathode current samples, and the electron multiplication gain G as described above, and the scintillation pulse noise charge $Q_{drms}(N,G)$ reduces with respect to the gain G. The magnitude of $j_\tau$ only depends on the elementary charge constant e and the number of elementary charges within the time interval $\Delta\tau$. Thus, the ratio $Q_{dSN}$ is a function of N only:

$$Q_{dSN}(N) := \frac{Q_{dint}}{Q_{drms}} = \frac{\sum i_\tau}{\sqrt{\sum i_\tau^2}} = \frac{G \sum j_\tau}{G\sqrt{\sum j_\tau^2}} = \frac{\sum j_\tau}{\sqrt{\sum j_\tau^2}}$$

It follows that the normalized noise charge $E_{dSN}$ for small N is proportional to N:

$$E_{dSN} := Q_{dSN}^2 \to N$$

The function $E_{dSN}$ can be linearized with a modification in the moment calculation by using derivatives. More specifically, N-th order derivatives correspond to n-th differences for discrete samples. With second differences, denoted as $$\frac{d^2 i_\tau}{d\tau},$$

in the square root expression instead of the unmodified current value $i_\tau$, the ratio remains still independent of G and the function $Q_{dN}$ approaches $const\sqrt{N}$:

$$Q_{dN}(N) := \frac{Q_{dint}}{Q_{drms}} = \frac{\sum i_\tau}{\sqrt{\sum \left(\frac{d^2 i_\tau}{d\tau}\right)^2}} \sim \sqrt{N}$$

The noise charge $E_N(N)$ is then defined as $$E_N(N) := Q_{dN}(N)^2$$

It has to be noted that even if the above example does show the $2^{nd}$ difference, other, especially higher differences can be used also. Experiments show that the use of the $4^{th}$ difference show very good results also. In general, the higher the difference used is, the better the result will be. As the resulting noise does increase with higher differences also, there is a practical limit to this increase.

Figure 3:
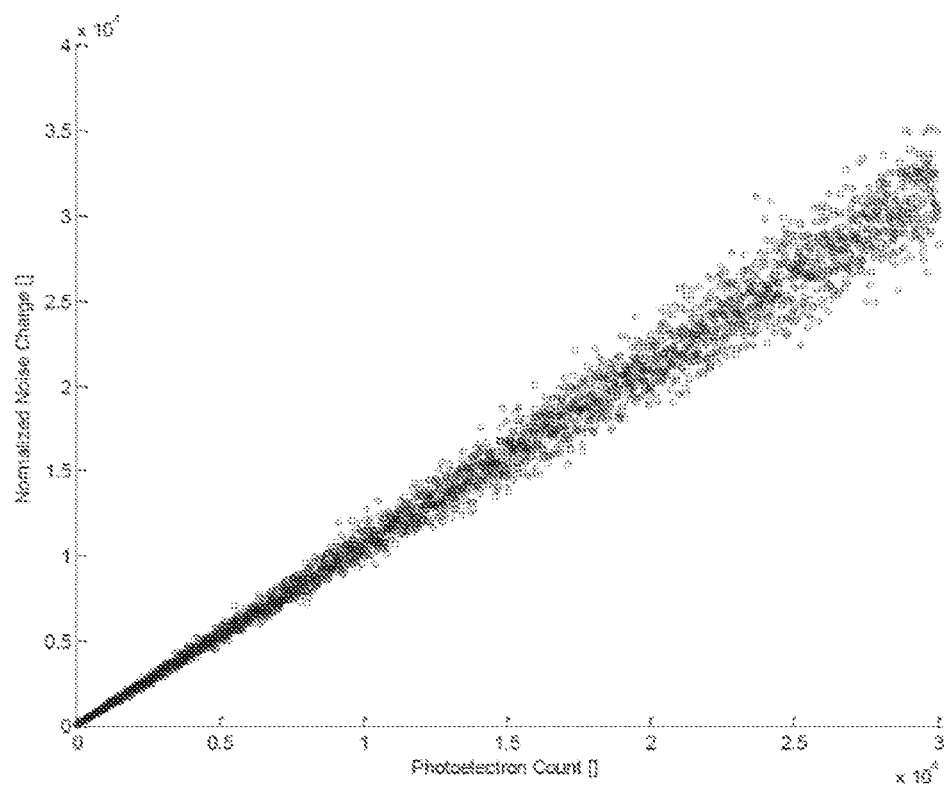

In FIG. 3 simulated noise charges $E_N(N)$ are plotted versus photoelectron counts from 0 to 3 MeV, which corresponds to 0 to 30.000 photoelectrons when QE is set to 10 for this simulation. $E_N(N)$ exhibits a strong statistical variance. It increases with higher energies. The variance is the "price" for the statistical method of deriving the underlying counts. It stems from the deconvolution of the random photoelectron pileup by double differentiation and the consecutive variance calculation. Scintillation pulses at the very same energy, the same total charge and the same number of photoelectrons will still have different, randomly distributed current trajectories.

The photoelectron noise charge may be used for gain stabilization of the detector system as follows: the noise charge of a few hundred pulses using an arbitrary selected gamma source or the natural background for that matter is fitted to a straight line. The gradient of the straight is a direct measure of the PMT gain. In order to stabilize the PMT photoelectron multiplication, the gain setting has to be adjusted to keep this gradient constant:

$$E_N(N) = \frac{\left(\sum i_\tau\right)^2}{\sum \left(\frac{d^2 i_\tau}{d\tau}\right)^2} = const N$$

It is obvious from the above, that this method for gain stabilization of a detector system can be performed in parallel to a running measurement, as there is no need for a calibration source or any other signal. As long as the sampling rate and the speed of the PMT is fast enough in relation to the scintillator crystal, the proposed utilization of a statistical photon count in combination with a classical charge integration provides a simple method for gain stabilization of the detector, as no additional hardware is necessary. Typically, the sampling rate is 5 to 1.000 times faster than the light decay constant of the scintillator, preferably between 50 and 1.000 times faster. Therefore, the sampling rate is typically between 5 and 4.000 MHz, but sampling rates of 10.000 MHz or even more may also be used. When using NaI(Tl) as a scintillator material, this would result in preferred sampling rates between 20 and 4.000 MHz, preferably between 20 and 4.000 MHz, as the light decay constant $\tau$ of NaI(Tl) is in the order of 250 ns. This makes both, the method and the detector, making use of said method, simple, reliable and comparably cheap.

It has to be noted that all functions described above in a digital setup, can also be realized in analog electronics. Therefore, the invention is not limited to a method and a device using digital electronics, even if the method is explained in the context of such a digital setup.

LIST OF ABBREVIATIONS $\delta$ overall multiplication factor for one dynode of a PMT
e elementary charge
$E_{dSN}$ normalized noise charge
eV electron volt
G (total) gain of a PMT
$I_A(t)$ anode current at the PMT
$i_\tau$ anode current sample
$j_\tau$ cathode current sample
N number of dynodes in the PMT
$q_e$ photo electron charge
QE quantum efficiency
$Q_{rms}/Q_{drms}$ noise (power) charge function $Q_{erms}$ RMS scintillation pulse noise charge
$Q_{int}/Q_{dint}$ total charge of a scintillation pulse measured at the anode
$Q_{SN}/Q_{dSN}$ ratio of $Q_{int}/Q_{dint}$ and $Q_{rms}/Q_{drms}$
PMT photo multiplier tube
RMS root mean square

What is claimed is:

1. A method for obtaining the energy of nuclear radiation from a scintillation detector system for the measurement of nuclear radiation, preferably gamma radiation, comprising a scintillation crystal, a light readout detector (LRD) and a fast digital sampling analog to digital converter (ADC), the scintillator being selected from a group of materials, having a light decay time of at least 1 ns, the method comprising the following steps:
    obtaining the anode current $I_A(t)$ at the LRD for at least one scintillation event with N photo electron charges $q_e$ at the entrance of the LRD, the LRD set to a suitable gain G,
    sampling the measured anode current $I_A(t)$ with a pre-defined sampling rate,
    obtaining the function of the scintillation pulse charges $Q_{dint}(N, G)$ at the anode of the LRD from said scintillation events by integrating the anode current $I_A(t)$ for a specific time period $\Delta t$, starting at a time $t_0$, i.e. by summarizing the digitized anode current samples $i_\tau$ for each scintillation event,
    obtaining the root mean square (RMS) function of the noise power charge $Q_{drms}(N, G)$ by calculating the square root of the summed squares of the second difference of digitized anode current samples $i_\tau$ for each such scintillation event,
    obtaining the function $Q_{dSN}(N)$ by calculating the ratio of $Q_{dint}(N, G)$ and $Q_{drms}(N, G)$, that ratio being an almost linear function of the number N,
    obtaining the constant gradient k from the at least one function $Q_{dSN}(N)=Q_{dint}(N, G)/Q_{drms}(N, G)=k*N$,
    obtaining the number N, said number N being equivalent to the energy E deposed in the scintillator by a nuclear radiation event, from the ratio of the measured values $Q_{dint}(N, G)$ and $Q_{drms}(N, G)$ and the gain factor k.

2. The method of claim 1, wherein the light readout detector (LRT) is selected from a group of detectors, comprising
    a photomultiplier tube (PMT) or a photo tube with a photo cathode as light detector,
    a semiconductor photomultiplier, and
    an Avalanche Photodiode.

3. The method of claim 1, wherein the output signal of the LRT is sampled with a sampling rate, being at least 5, preferably at least 200 and even more preferred at least 1.000 times faster than the light decay constant of the scintillator selected.

4. The method of claim 1, wherein NaI(Tl) is selected as a scintillator material, where the output signal of the LRT is sampled with a sampling frequency of at least 20 MHz.

5. The method of claim 4, where the output signal of the LRT is sampled with a sampling frequency between 200 and 4.000 MHz.

6. A stabilized detector system for the measurement of nuclear radiation, preferably gamma radiation, comprising a scintillation crystal, a light readout detector (LRT) and a fast digital sampling analog to digital converter (ADC), the scintillator being selected from a group of materials, having a light decay time of at least 1 ns, the ADC being set to operate with a very high sampling rate of at least 5 MHz, wherein the detector system conducts the method steps of claim 1.

7. A Stabilized detector system for the measurement of nuclear radiation, preferably gamma radiation, comprising a scintillation crystal, a light readout detector (LRT) and an analog signal electronics for evaluation of the data, the scintillator being selected from a group of materials, having a light decay time of at least 1 ns, wherein the detector conducts the method steps of claim 1 using analog signal electronics in place of digital electronics.

* * * * *